US012478542B2

(12) United States Patent
Fongaro

(10) Patent No.: US 12,478,542 B2
(45) Date of Patent: Nov. 25, 2025

(54) POSTOPERATIVE PLASTIC SURGERY AESTHETIC LYMPHATIC DRAINAGE METHOD

(71) Applicant: Anna Paola Barbosa Fongaro, Herriman, UT (US)

(72) Inventor: Anna Paola Barbosa Fongaro, Herriman, UT (US)

(*) Notice: Subject to any disclaimer, the term of this patent is extended or adjusted under 35 U.S.C. 154(b) by 580 days.

(21) Appl. No.: 18/069,359

(22) Filed: Dec. 21, 2022

(65) Prior Publication Data

US 2024/0207129 A1 Jun. 27, 2024

(51) Int. Cl.
*A61H 9/00* (2006.01)
*A61F 13/08* (2006.01)
*A61H 23/00* (2006.01)
*A61K 33/44* (2006.01)
*A61N 1/18* (2006.01)
*A61N 1/40* (2006.01)
*A61N 5/06* (2006.01)
*A61N 5/067* (2006.01)
*A61N 7/00* (2006.01)

(52) U.S. Cl.
CPC ......... *A61H 9/0092* (2013.01); *A61F 13/085* (2013.01); *A61H 9/0007* (2013.01); *A61H 23/008* (2013.01); *A61K 33/44* (2013.01); *A61N 1/18* (2013.01); *A61N 1/40* (2013.01); *A61N 5/067* (2021.08); *A61N 7/00* (2013.01); *A61H 2009/0064* (2013.01); *A61H 2201/10* (2013.01); *A61H 2201/105* (2013.01); *A61H 2201/1246* (2013.01); *A61H 2201/1253* (2013.01); *A61H 2201/164* (2013.01); *A61H 2201/165* (2013.01); *A61H 2205/10* (2013.01); *A61N 2005/0652* (2013.01)

(58) Field of Classification Search
CPC .................................. A61H 23/008
See application file for complete search history.

(56) References Cited

U.S. PATENT DOCUMENTS

| | | | | |
|---|---|---|---|---|
| 5,843,007 A * | 12/1998 | McEwen | ............ | A61H 9/0078 601/149 |
| 6,353,145 B1 * | 3/2002 | Church | ............... | A61L 15/40 602/41 |
| 9,320,913 B2 * | 4/2016 | Dimino | .................... | A61N 1/40 |
| 2015/0297877 A1 * | 10/2015 | Pelkus | ................ | A61N 5/0624 604/20 |
| 2016/0206500 A1 * | 7/2016 | Steinlauf | ............ | A61H 9/0078 |
| 2016/0331620 A1 * | 11/2016 | Kazanchyan | ...... | A61N 1/36003 |
| 2022/0111223 A1 * | 4/2022 | Taylor | .................... | A61N 2/008 |
| 2022/0168495 A1 * | 6/2022 | Locke | ................ | A61M 1/962 |
| 2022/0203112 A1 * | 6/2022 | Iger | ...................... | A61N 1/328 |
| 2022/0387796 A1 * | 12/2022 | Malter | ................ | A61N 1/0492 |
| 2023/0011693 A1 * | 1/2023 | Spence | ................ | A61N 1/0484 |
| 2023/0146988 A1 * | 5/2023 | Schwarz | ................ | A61H 9/005 601/15 |

* cited by examiner

*Primary Examiner* — Joseph D. Boecker
*Assistant Examiner* — Thomas W Greig
(74) *Attorney, Agent, or Firm* — Steven Rinehart

(57) ABSTRACT

A method of draining a lymphatic system of a patient postoperatively using various physical techniques, many applied manually, including microcurrent, plastic wrap, suction cup, shockwave(s), lipolaser light and ultrasound. The method provides for reducing pain, swelling, preventing scar tissue, treating scar tissue, improving body shape, optimizing plastic surgical results, cell oxidation and improved healing through stimulated drainage of the lympathic system.

7 Claims, 6 Drawing Sheets

POSTOPERATIVE PLASTIC SURGERY AESTHETIC LYMPHATIC DRAINAGE METHOD

BACKGROUND OF THE INVENTION

Field of the Invention

This invention relates to physical recovery methods, and more particularly relates to a new and useful method of draining a lymphatic system.

Description of the Related Art

Patients undergoing plastic surgical procedures such as lipsuction, breast implants, tummy tuck, breat lift, face lift etc. (as well as medical surgeries such as sclerotherapy) are often prescribed rest and gentle activity following these procedures. Typically, after these procedures, lymph nodes within the lymphatic system become swollen as they attempt and clear fluids from the body incidental to the surgery which may contain waste, metabolized cells, and chemicals introduced during the surgery. Recovery times and recovery results can be optimized by helping drain the lymphatic system of these collected contaminants.

The lymphatic system is the system of tissues, vessels, and organs that work in conjunction to maintain fluid levels in the body, support immune function, and keep blood circulating. The system carries lymph, a clear fluid that contains contaminants, toxins and discardable organic material. Waste is removed from the body as clean lymph circulates back through. When the lymphatic system isn't moving lymph through the body properly, excess fluid in the body builds up, causing edema, building up scar tissue, and creating a puffy, uncomfortable look and feel—prolonging surgical recovery times and hampering surgical results.

Although patients and physical therapists will sometimes put pressure on lymph nodes to try and drain them, there exists no efficient method in the art of draining the entire lymphatic system.

There is a need in the art for a method of draining the lymphatic system to move the fluid that's built up to flush excess waste from the body. This prevents fibrosis, which is the development of thick, fibrous scar tissue under the skin as well as reduces swelling and bruising. It is an object of the present invention to provide such a method.

SUMMARY OF THE INVENTION

From the foregoing discussion, it should be apparent that a need exists for a postoperative lymphatic drainage method. Beneficially, such a method would overcome many of the difficulties with prior art by providing an efficient, multi-step method of draining lymph from the lymphatic system.

The present invention has been developed in response to the present state of the art, and in particular, in response to the safety problems and needs in the art that have not yet been fully solved by currently available apparatuses, systems and methods. Accordingly, the present invention has been developed to provide a postoperative method of draining a lymphatic system, the steps of the method comprising: inserting the legs of a patient postoperatively into two pneumatic sleeves and alternatively inflating and deflating the sleeves using a pump to apply oscillating pressure to a patient's legs over a period of at least 30 minutes, the pressure applied using the sleeves peaking at 30-240 mmHg; applying a radio frequency probe directly to a surgical site on the patient's body for 1-2 minutes; applying a microcurrent to the surgical site of 200 uA to 400 uA for 3-5 minutes; between 24-48 hours postoperatively, performing 12 or more hand-pumping maneuvers in a sequence from the incision point, wherein the hand-pumping maneuvers are performed by rolling a heal of a palm against a skin surface of the patient and rolling the hand and a pressure point in contact with the skin forward toward fingers of the hand; applying mud comprising charcoal powder and water to a surgical site within 1-3 inches of the incision point exclusive of the incision itself; wrapping the surgical site with plastic wrap; and performing a plurality of hand-pumping maneuvers on the plastic wrap; using a radio frequency probe of an aestetic radiofrequency machine, after three weeks posteoperatively, for 1-2 minutes to impart a radiofrequency of 0.6 MHz-2.4 MHz to the surgical site; using a 2.8-3.2 MHz ultrasound machine after five weeks postoperatively for 1-2 minutes; and applying 200-300 sonic shockwaves of 30 mJ to 50 mJ energy at a frequency of 3 Hz to 5 Hz to the surgical site.

The method may further comprise applying the hand-pumping maneuver to the incision point and surgical site. The hand-pumping maneuver may be performed by pressing a heel of a palm softly against a skin surface of the patient and rolling the hand and a pressure point in contact with the skin forward toward fingers of the hand.

In various embodiments, the method further comprises applying lipolaser light to the surgical site. The method may further comprise at least 15 days postoperatively, applying a suction cup to the surgical site in response to visual identification of scar tissue.

The method may also further comprise at least 15 days postoperatively, applying a suction cup on scar tissue only.

A second postoperative method of draining a lymphatic system is provided, the steps of the method comprising: inserting the legs of a patient postoperatively into two pneumatic sleeves and alternatively inflating and deflating the sleeves using a pump to apply oscillating pressure to a patient's legs over a period of at least 30 minutes; applying a microcurrent to the surgical site, but no on the incision itself, of 200 uA to 400 uA at 1.15 Hz to 2.5 Hz intensity for 3-5 minutes beginning 24-48 postoperatively; performing more than a dozen hand-pumping maneuvers on the incision in a sequence of pumping motion patterns progressively moving from lymph nodes near the incision to more distant lymph nodes; applying mud comprising a charcoal powder mixed with water to a surgical site within 1-2 inches of the incision point exclusive of the incision itself; wrapping the surgical site with plastic wrap; and performing a plurality of hand-pumping maneuvers on the plastic wrap until up to six weeks postoperatively; using a radio frequency probe of an aestetic radiofrequency machine, after three weeks posteoperatively, for 1-2 minutes to impart a radiofrequency of 0.6 MHz-2.4 MHz to the surgical site; using a 2.8-3.2 MHz ultrasound machine after five weeks postoperatively for 1-2 minutes; applying 200-300 sonic shockwaves of 30 mJ to 50 mJ energy at a frequency of 3 Hz to 5 Hz to the surgical site; at least 20 days postoperatively, applying a single suction cup to the surgical site; sliding the suction cup across a skin surface within the surgical site every 10-30 seconds; applying lipolaser light to the surgical site using pulsing light at 0-4 weeks postoperatively and continuous light after 4 weeks postoperatively.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to convey a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a method, or technique, the steps of which comprise using a hand-pumping maneuver to move the extra cellular lymph and extra cellular protein that causes edema, pain, scar tissue, and reduced oxygen for cells towards the main lymphatic organs and lymph nodes. The causes the patient to urinate more frequently and flush out the toxins and edema, resulting in less swelling, greater cellular oxygenation, less scar tissue, maximizing blood circulation, and accelerating the healing process in combination with technologies such as a compression leg machine, microcurrent machines, radio frequency machine, ultrasound machine, lipolaser machine, and other recited steps.

Figure 1A:
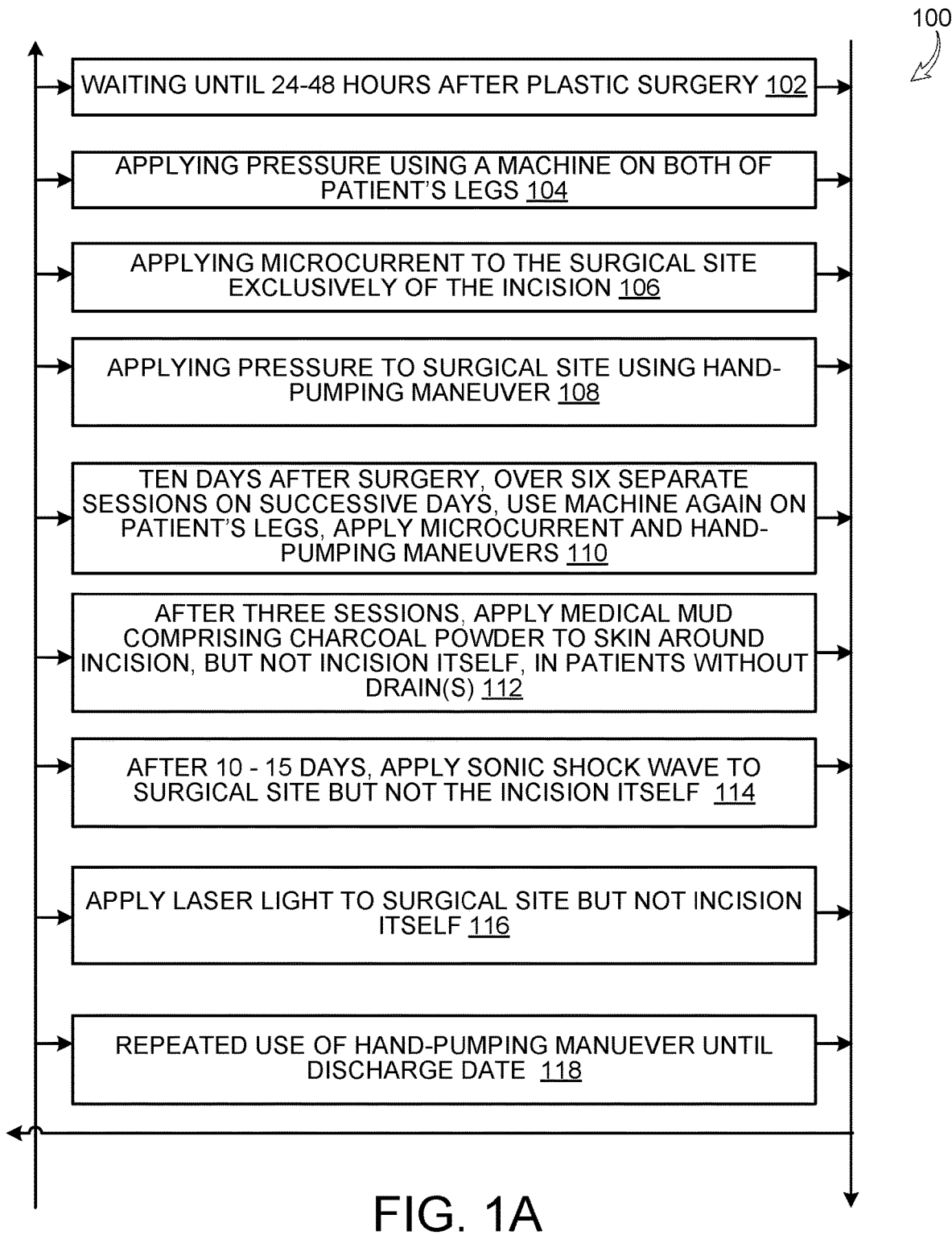
FIG. 1A illustrates a flowchart of the steps of a method of draining a lymphatic system using postoperative treatment techniques in accordance with the present invention.
Figure 1B:
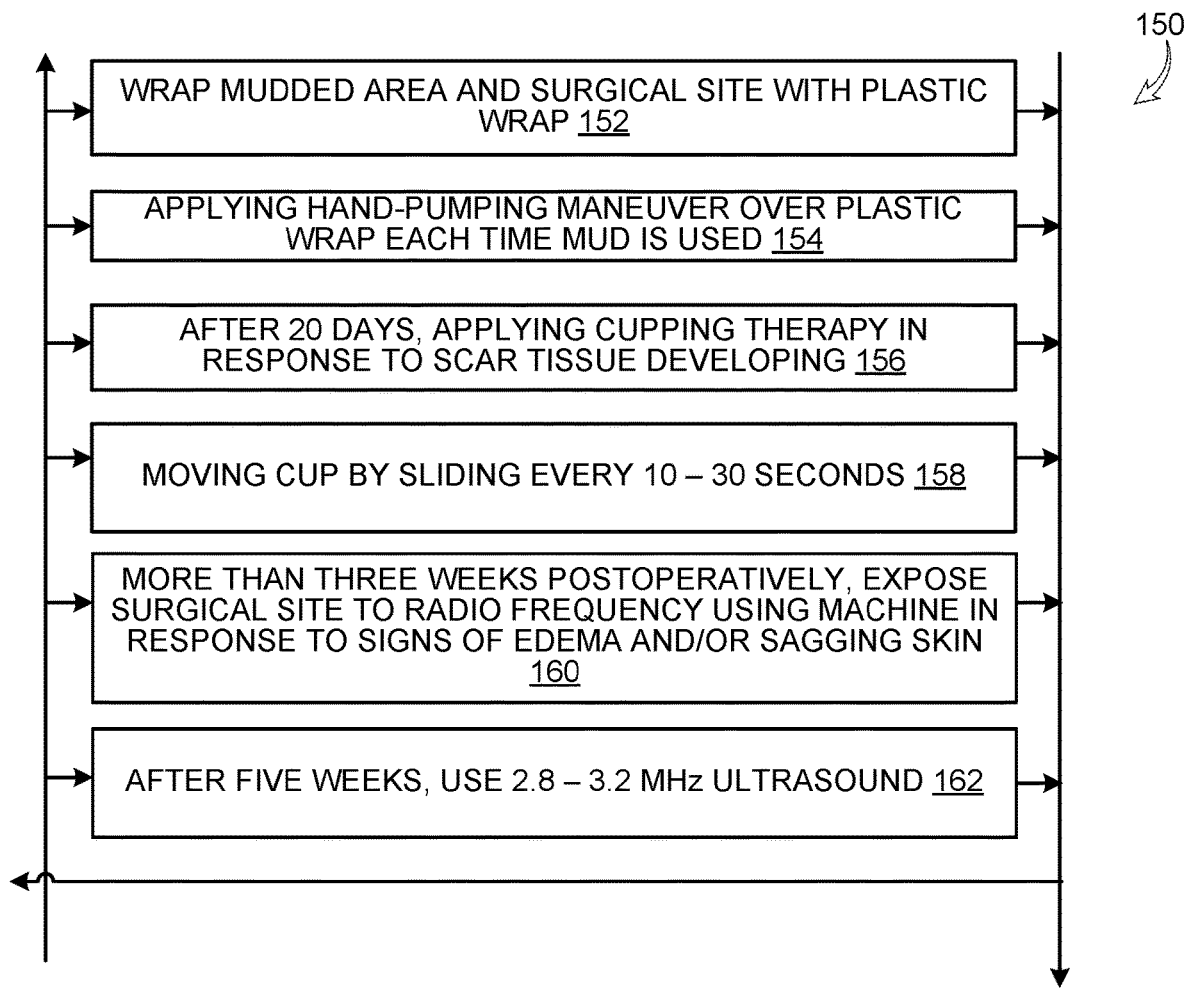
FIG. 1B illustrates a flowchart of the steps of a method of draining a lymphatic system using postoperative treatment techniques in accordance with the present invention.

FIGS. 1A-1B illustrate a flowchart of the steps of a method 100, 150 of draining a lymphatic system using postoperative lymphatic drainage in accordance with the present invention.

The steps of the method 100 may include waiting 102 until 24 hours to 48 hours after surgery to initiate use of a compression machine 500 on a patient's legs to prevent bloodclotting, by applying 104 pressure to the legs, applying 106 microcurrent to each leg of between 70 volts and 200 volts and 0.4 to 5 amps through electrodes in contact with a patient's skin surface, using the compression machine 500. In some embodiments, a microcurrent between 200 uA and 400 uA and may be applied at a frequency of between 1.15 Hz and 2.5 Hz.

The microcurrent serves to repair tissue and control pain through cellular stimulation.

Using the compression apparatus 500, pressure may be applied 104 simultaneously by the machine 500 to both legs in some embodiments. As the pressure is oscillated from low to high, the pressure may peak at 30-240 mmHg in various embodiments. This oscillating of the pressure takes place for a period of more than 30 minutes each treatment session.

Following application 106 of microcurrent, a "hand-pumping manuever" is used 108 to apply pressure sequentially across the entire body of the patient (including from the feet to the pelvic region) as further described below in relation to FIG. 2.

The hand-pumping maneuver 108 may be applied 108 using 9-20 hand-pumping maneuvers in connection with each session, or in connection with each step of the methods 100, 150 referencing the hand-pumping maneuver 108. The hand-pumping maneuver 108 may begin my applying soft pressure to the incision(s) itself, then moving around the surgical site applying the hand-pumping maneuver 108 successively in more-and-more distant (or distal) regions of the surgical site.

Ten to fifteen days after surgery, the compression machine 500 may be used 110 again on a patient's legs, in connection with further application of microcurrent, followed immediately by application 112 of medical-grade mud comprising charcoal powder to an area of skin surrounding an incision (the "surgical site"), but not to the incision itself. The mud may also comprise water. The mud may be applied to a region (i.e., surgical site) of the body 12-24 inches in radius from the incision. The area of skin upon which the medical-grade mud is applied is then wrapped 152, or enveloped, in plastic wrap to prevent the wearing away of the mud through contact with other objections. The mud is applied around a surgical site, which is the skin of the body within 1-2 inches of the incision itself. The hand-pumping maneuver is then applied 154 over the plastic wrap in various embodiments.

A sonic shock wave is applied 114 to the surgical site using the machine 500 to break up scar tissue and improve circulation through the surgical site.

In various embodiments, 28 to 33 days after surgery, the machine 500 may again be used to apply pressure, sonic shock waves of between 30-50 mJ of energy and 3 Hz-5 Hz intensity and microcurrent to a patient's body followed by further application of the hand-pumping maneuver 108.

Subsequently, a cupping therapy may be applied 156 as further discussed below in relation to FIG. 8.

The various recited steps of the method 100, 150 may be repeated at regular time intervals postoperatively, including at 15 days, 30 days, 45 days, 60 days, etc.

Figure 2:
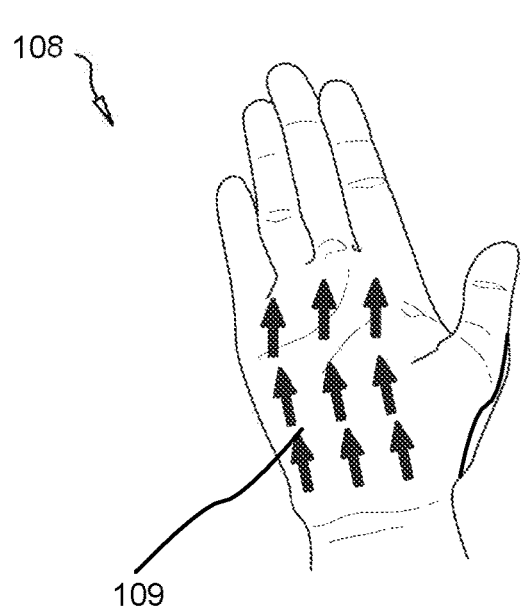
FIG. 2 illustrates a step in a method of draining a lymphatic system using postoperative treatment techniques in accordance with the present invention.

FIG. 2 illustrates a step 108 in a method 100, 150 of draining a lymphatic system using postoperative treatment in accordance with the present invention.

The hand-pumping maneuver 108 is applied and begins starting to close to the lymph node of the injured area by pressing lymph outwardly away from an incision point. Pressure is applied using hands 109 to an area of skin surrounding an incision point and sequentially applying radially around an incision point, slowing increasing the distance from the incision point where pressure is being applied.

The hand-pumping maneuver 108 is repeated at least nine times while rolling the hand from palm to fingers. An operator begins to put pressure on the heel of the palm of the hand then rolls the hand and pressure point toward the top of metacarpals where they meet the fingers, and then release the pressure on the surgical area (including incisions and surrounding areas). The heel of the hand is always put into place on the area of skin where the fingers of the hand in the previous motion were lifted.

Figure 3:
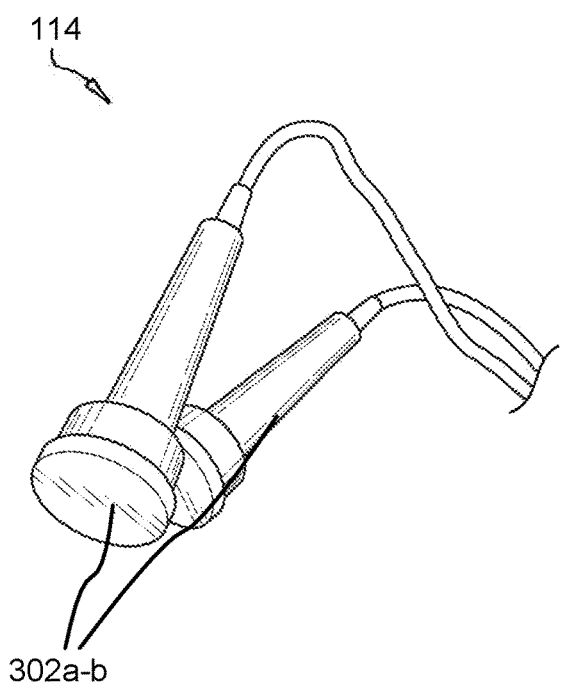
FIG. 3 illustrates a step in a method of draining a lymphatic system using postoperative treatment techniques in accordance with the present invention.

FIG. 3 illustrates a step 114 in a method of draining a lymphatic system using postoperative treatment technique in accordance with the present invention.

The terminals 302a-b are used to apply a 2.8-3.2 MHz ultrasonic machine to the surgical site. In various embodiments, the waves emitted by the ultrasonic machine are pulsed over 200-300 pulses. In other embodiments, the wave emitted into the skin of the surgical site is continuous.

Figure 4:
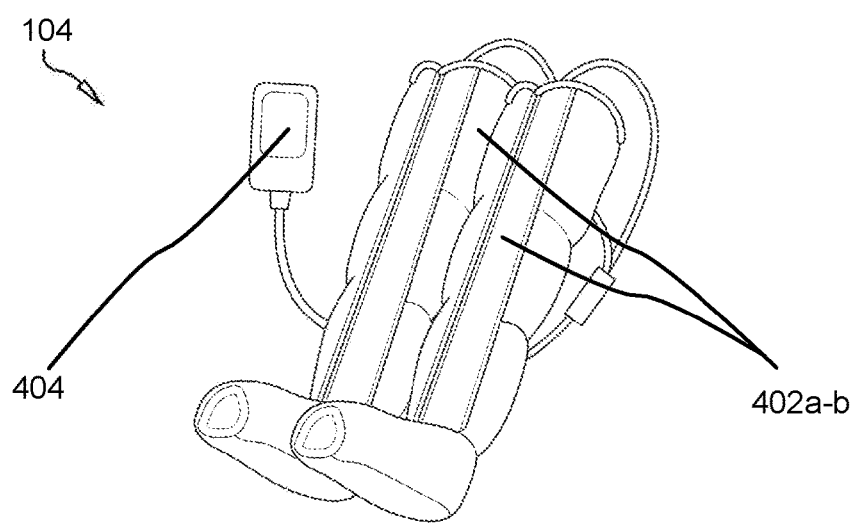
FIG. 4 illustrates a step in a method of draining a lymphatic system using postoperative treatment techniques in accordance with the present invention.

FIG. 4 illustrates a step in a method of draining a lymphatic system using a compression machine 500a in accordance with the present invention.

The legs of a patient are inserted into sleeves 402a-b which may be inflated to apply pressure to the legs using a pump 404. The sleeves 402a-b are alternatively inflated, and deflated, over the period of 30 minutes, regardless of where on the body the incision was made.

Figure 5:
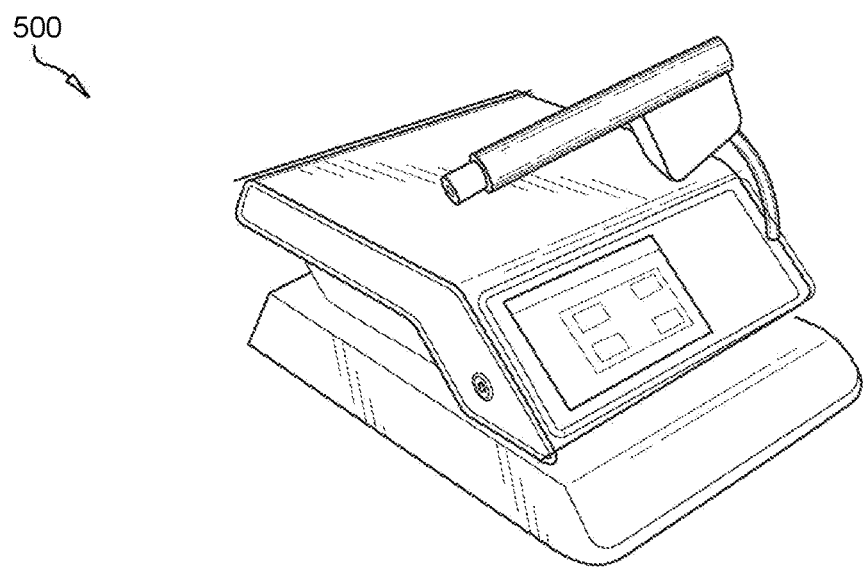
FIG. 5 illustrates a step in a method of draining a lymphatic system using postoperative treatment techniques in accordance with the present invention.

FIG. 5 illustrates a step in a method of draining a lymphatic system using postoperative treatment technique in accordance with the present invention.

The pneumatic machine system 500 may inflate the sleeves 402 with pressurized ambient air or a liquid using means known to those of skill in the art including a pump, applying 104 pressure to the legs and tending to move lymph throughout the lymphatic system.

Figure 6:
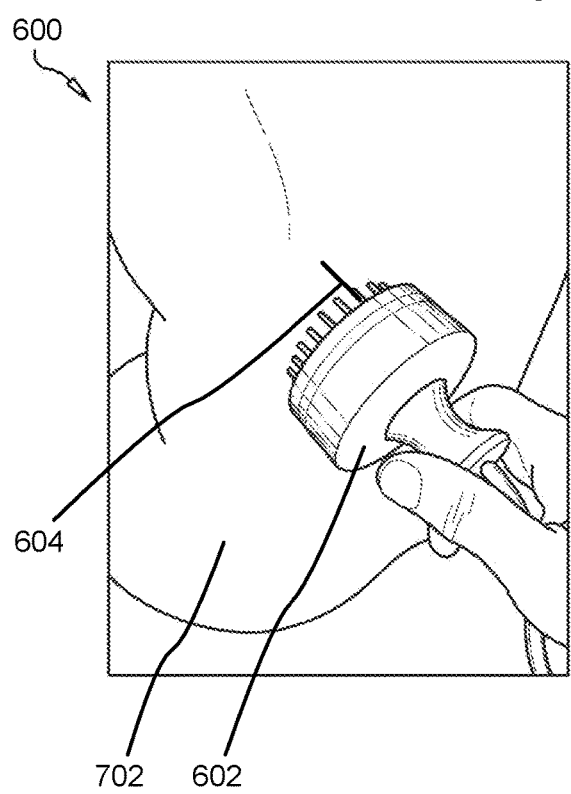
FIG. 6 illustrates a step in a method of draining a lymphatic system using postoperative treatment techniques in accordance with the present invention.

FIG. 6 illustrates a step 600 in a method of draining a lymphatic system using postoperative treatment technique in accordance with the present invention.

A microcurrent head 602 is applied to the surgical site 604 on the body 702.

The steps of the disclosed method may be successively applied over a period of six months.

Figure 7:
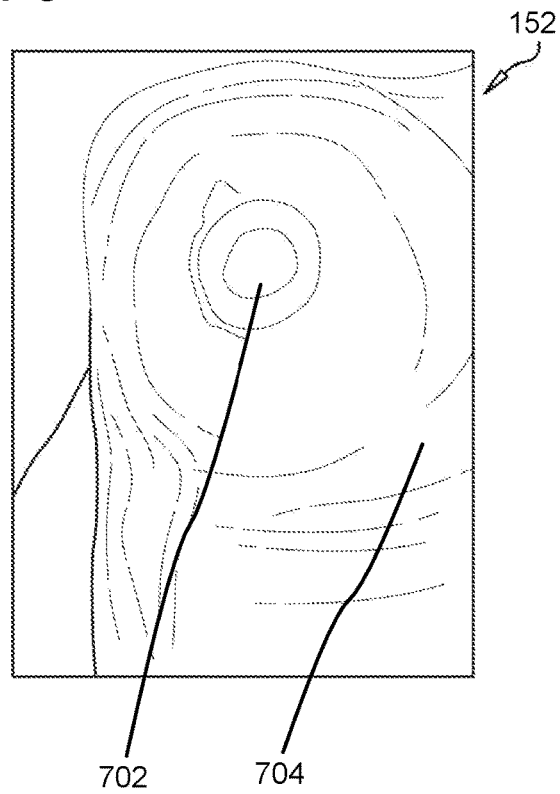
FIG. 7 illustrates a step in a method of draining a lymphatic system using postoperative treatment techniques in accordance with the present invention.

FIG. 7 illustrates a step 152 in a method of draining a lymphatic system using postoperative treatment technique in accordance with the present invention.

In step 152, a body 702, or body extremity, is wrapped 152 in plastic wrap 702 after being mudded 112.

Figure 8:
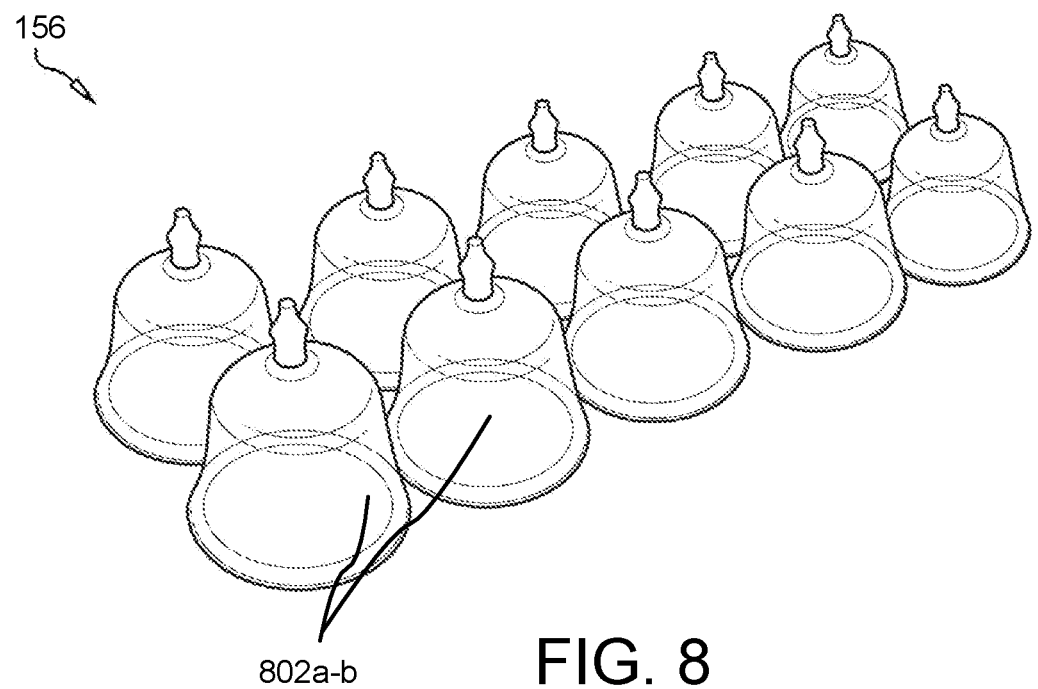
FIG. 8 illustrates a step in a method of draining a lymphatic system using postoperative treatment techniques in accordance with the present invention.

FIG. 8 illustrates a step in a method 156 of draining a lymphatic system using postoperative treatment technique in accordance with the present invention.

In various embodiments, a cup 802 is compressed and placed upon a patient's skin in the surgical site near the incision to help with blood flow and scar tissue formation, as well as stimulating lymph movement within the lymphatic system. The suction cup 802 may alternatively be placed on the scare tissue (i.e., "scar tissue area") around the incision, but not the incision itself, followed by rubbing (or sliding) the cup 802 over the skin with minimal suction using 3-5 movements of the cup 802. The surgical site may be, in some embodiments, be 1-3 inches from an incision. Cupping therapy in accordance herewith is used after plastic surgery performed on the body of a patient, never on the face or breats.

In various embodiments, the suction cup 802 is omitted from the method 800, or used only after expiration of a predetermined amount of time postoperatively, such as 15 days. In some embodiments, the suction cup 802 is applied only within overlapping surgical sites in surgeries around multiple incisions.

Although multiple cups 802 are shown, in various embodiments, only a single cup 802 is used within each surgical area at a time. The cup 802 may be applied 15 days postoperatively within the surgical site, typically beginning with the cup adjacent to the incision, then being slid every 10-30 second outwardly toward a periphery of the surgical site. In various embodiments, the surface of the skin within the surgical area is first wetted to facilitate sliding of the cup with less resistance/friction than permitted on dry skin. The sliding motion of the cup 802 helps move subcutaneous lymph away from the incision(s) into deeper capillaries of the lymphatic system.

Figure 9:
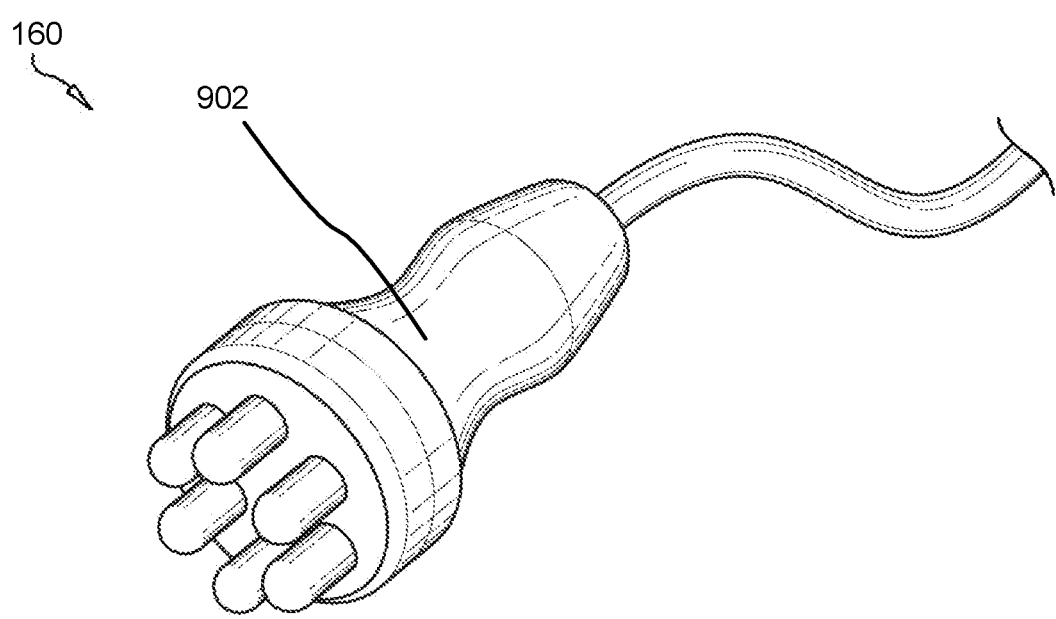
FIG. 9 illustrates a step in a method of draining a lymphatic system using postoperative treatment techniques in accordance with the present invention.

FIG. 9 illustrates a step in a method 158 of draining a lymphatic system using postoperative treatment technique in accordance with the present invention.

A radio frequency probe 902 is used 160 to apply radiofrequencies to a skin area. The probe 902 may form part of an aestetic radiofrequency machine known to those of skill in the art.

Figure 10:
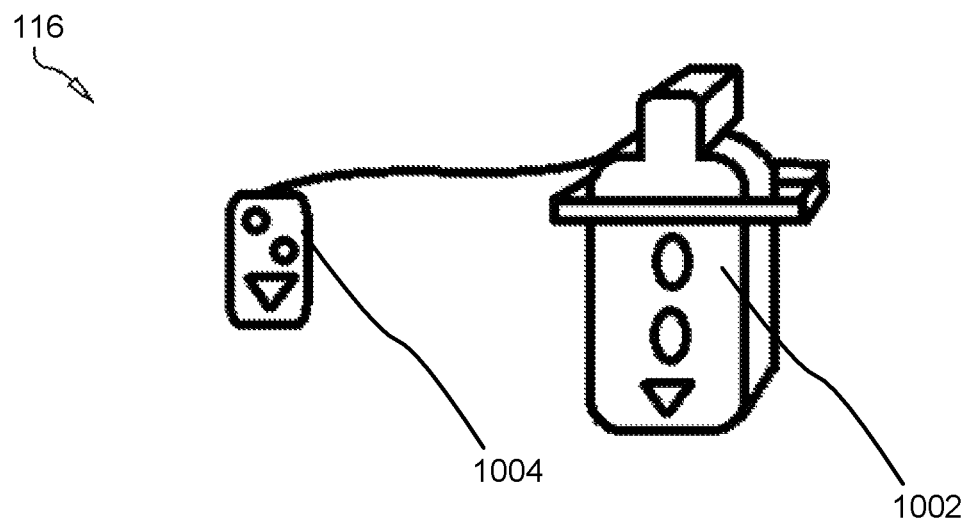
FIG. 10 illustrates a step in a method of draining a lymphatic system using postoperative treatment techniques in accordance with the present invention.

FIG. 10 illustrates a step in a method of draining a lymphatic system using postoperative treatment techniques in accordance with the present invention.

A lipolaser light machine 1002 is shown, operable to delivery light using paddles 1004 to adipocytes surrounding the incision within the surgical site. The machine 1002 may include diodes, or probes, having LED arrays operable to output light at a peak frequency of 2.80 Hz to 55 Hz. In various embodiments, the LED array is operable to selectively output light at a peak frequency of 80 Hz to 115 Hz. The light from the lipolaser light machine/apparatus 1002 may illuminate the body at a peak wavelength of 661-710 nm.

Because the dermis in the surgical site contains collagen fibrils, light within the recited ranges is desirable for optimal results. Photons entering the dermins are scattered. Thus, the lipolaser light apparatus 1002 is used within the surgical site but not on the incision itself in most embodiments.

The lipolaser light apparatus 1002 comprises selective pulse functionality. Between 0 and 6 weeks postoperatively, the light used to illuminate the surgical site should be set pulse; while, after four weeks postoperatively, the light should be set to continuous.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A postoperative method of draining a lymphatic system, the steps of the method comprising:
   inserting the legs of a patient postoperatively into two pneumatic sleeves and alternatively inflating and deflating the sleeves using a pump to apply oscillating pressure to a patient's legs over a period of at least 30 minutes, the pressure applied using the sleeves peaking at 30-240 mmHg;
   applying a radio frequency probe directly to a surgical site on the patient's body for 1-2 minutes;
   applying a microcurrent to the surgical site of 200 uA to 400 uA for 3-5 minutes;
   between 24-48 hours postoperatively, performing 12 or more hand-pumping maneuvers in a sequence from an incision point, wherein the hand-pumping maneuvers are performed by rolling a heel of a palm of a hand against a skin surface of the patient and rolling the hand and a pressure point in contact with the skin forward toward fingers of the hand;
   applying mud comprising charcoal powder and water to the surgical site within 1-3 inches of the incision point exclusive of the incision itself;
   wrapping the surgical site with plastic wrap; and
   performing a plurality of the hand-pumping maneuvers on the plastic wrap;
   using a radio frequency probe of an aesthetic radiofrequency machine, after three weeks postoperatively, for 1-2 minutes to impart a radiofrequency of 0.6 MHz-2.4 MHz to the surgical site;
   using a 2.8-3.2 MHz ultrasound machine after five weeks postoperatively for 1-2 minutes; and
   applying 200-300 sonic shockwaves of 30 mJ to 50 mJ energy at a frequency of 3 Hz to 5 Hz to the surgical site.

2. The method of claim 1, further comprising applying the hand-pumping maneuver to the incision point and surgical site.

3. The method of claim 1, further comprising applying lipolaser light to the surgical site.

4. The method of claim 1, further comprising at least 15 days postoperatively, applying a suction cup to the surgical site in response to visual identification of scar tissue.

5. The method of claim 1, further comprising at least 15 days postoperatively, applying a suction cup on scar tissue only.

6. A postoperative method of draining a lymphatic system, the steps of the method comprising:
   inserting the legs of a patient postoperatively into two pneumatic sleeves and alternatively inflating and deflating the sleeves using a pump to apply oscillating pressure to a patient's legs over a period of at least 30 minutes;
   applying a microcurrent to a surgical site, but not on an incision of a surgical site itself, of 200 uA to 400 uA at 1.15 Hz to 2.5 Hz intensity for 3-5 minutes beginning 24-48 postoperatively;
   performing more than a dozen hand-pumping maneuvers on the incision in a sequence of pumping motion patterns progressively moving from lymph nodes near the incision to more distant lymph nodes;
   applying mud comprising a charcoal powder mixed with water to the surgical site within 1-2 inches of the incision point exclusive of the incision itself;
   wrapping the surgical site with plastic wrap; and
   performing a plurality of the hand-pumping maneuvers on the plastic wrap until up to six weeks postoperatively;
   using a radio frequency probe of an aesthetic radiofrequency machine, after three weeks postoperatively, for 1-2 minutes to impart a radiofrequency of 0.6 MHz-2.4 MHz to the surgical site;
   using a 2.8-3.2 MHz ultrasound machine after five weeks postoperatively for 1-2 minutes;
   applying 200-300 sonic shockwaves of 30 mJ to 50 mJ energy at a frequency of 3 Hz to 5 Hz to the surgical site;
   at least 20 days postoperatively, applying a single suction cup to the surgical site;
   sliding the suction cup across a skin surface within the surgical site every 10-30 seconds;
   applying lipolaser light to the surgical site using pulsing light at 0-4 weeks postoperatively and continuous light after 4 weeks postoperatively.

7. The method of claim 5, further comprising repeating all of the recited steps at regular time intervals postoperatively.

* * * * *